July 23, 1963  C. W. OSTROM  3,098,533
ELECTRIC DISCHARGE IMPULSE SUBMARINE DRIVERS
Filed July 5, 1960
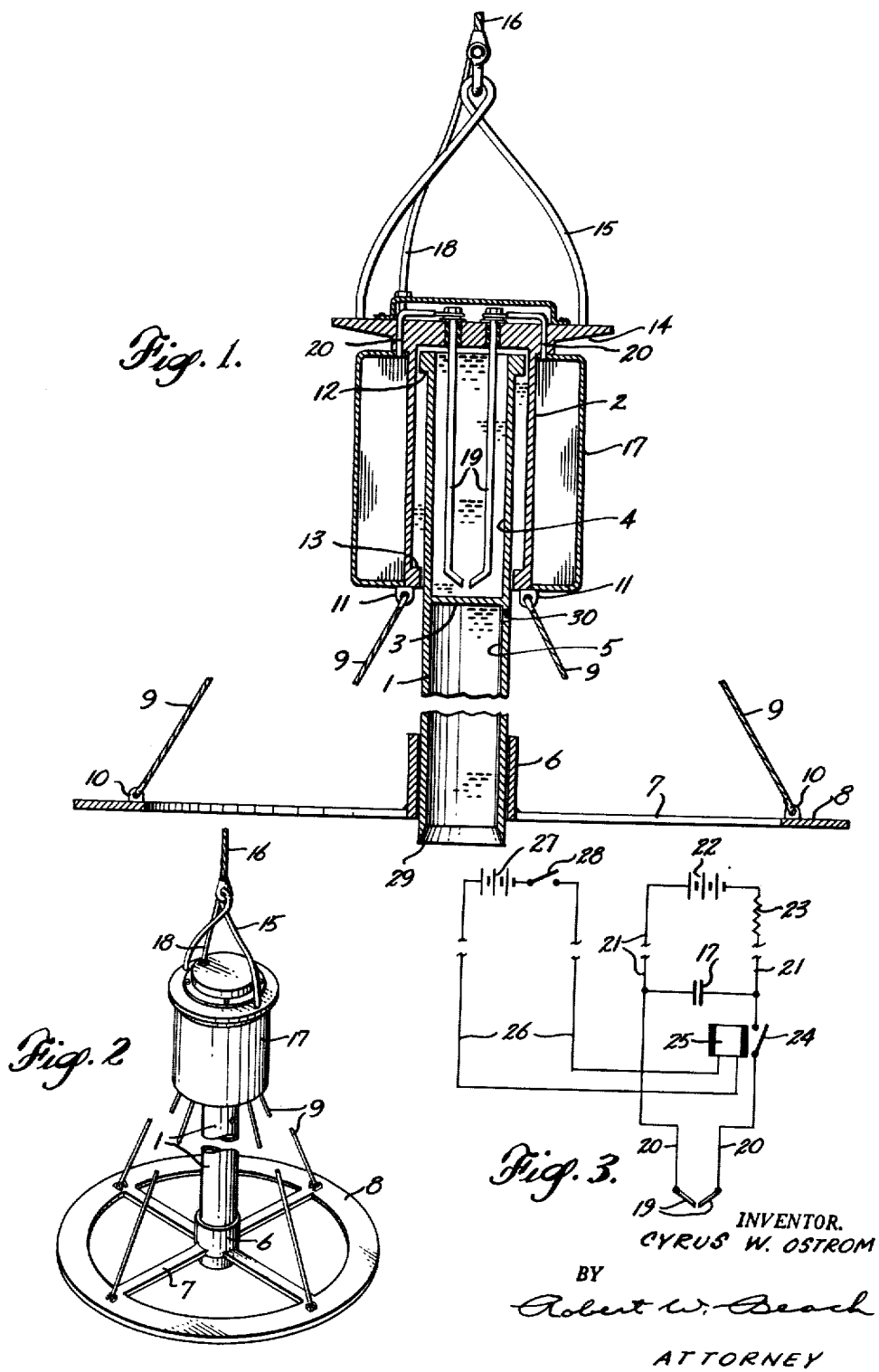
INVENTOR.
CYRUS W. OSTROM
BY
Robert W. Beach
ATTORNEY

United States Patent Office 3,098,533
Patented July 23, 1963

3,098,533
ELECTRIC DISCHARGE IMPULSE
SUBMARINE DRIVERS
Cyrus Warren Ostrom, 3201 1st Ave. S., Seattle 4, Wash.
Filed July 5, 1960, Ser. No. 40,791
6 Claims. (Cl. 175—6)

This invention relates to a submarine driver in which the driving force is produced by the impulse resulting from an electric discharge under water adjacent to the member to be driven.

In modern submarine exploration it is desirable to take samples from the ocean bottom, which samples should penetrate to a substantial depth below the surface of the ground, and such samples may be removed in the form of cores. The difficulty in taking such samples in deep water, such as several miles below the surface of the water, has been to produce an effective driving force which would drive into the ground a member which would remove a core from it.

The principal object of the present invention, therefore, is to provide mechanism which will produce at the location of a core sampling member far beneath the surface of a body of water a force great enough to drive the core sampling member into hard ground. A particular object is to provide mechanism which will produce periodic driving impulses the intensity and timing of which can be controlled, either in the design of the equipment or in the manner in which it is operated, or both.

Another object of this invention is to provide equipment of simple construction which will operate with substantially equal effectiveness irrespective of the depth of the water above the bottom from which a sample core is to be removed. In the design of such equipment it is also an object to have few moving parts and a minimum of mechanism to get out of order.

In controlling the frequency of the driving impulses such impulses can be produced by mechanical switching, or the frequency of the impulses can be dependent on the characteristics of an electric circuit.

Intense force can be produced for effecting driving impulses for the purpose of sinking a core sampling tube into the bottom of a body of water, for example, by producing a discharge across a spark gap beneath the water if the rate of discharge is sufficiently rapid and the current is sufficiently great. The spark jumping the spark gap should occur in a time interval preferably one- to two-millionths of a second and not more than a few millionths of a second, and the spark gap should be from three-eighths of an inch to three-quarters of an inch in width, preferably of the order of one-half of an inch in width, and the voltage and current of the electric discharge across the spark gap will be very high. The resulting gasification or disintegration of the water within the spark gap will produce an instantaneous expansion acting on the water around the spark gap to produce a pressure on it which will be transmitted by the water to the member to be driven because of such expansion of the medium in the spark gap.

FIGURE 1 is a longitudinal central sectional view through representative equipment utilizing the present invention.

FIGURE 2 is a top perspective view of such equipment on a smaller scale.

FIGURE 3 is a circuit diagram of a representative electrical circuit which can be used in equipment utilizing the present invention.

In order to understand a typical environment in which a submarine electrical discharge impulse could be utilized effectively, the equipment shown in FIGURE 1 has been illustrated. This equipment includes the core sampling tube 1, the upper end of which is received within the cylindrical casing 2 with a reasonably close fit. The upper portion of the tube has in it a partition 3, dividing the impulse cavity 4 formed above such partition from the core-receiving cavity 5 below the partition 3. The lower end of the tube 1 may be guided by the collar 6 through which the tube extends. This collar is carried by the spider 7 mounted within the ring 8.

It is desired to drive the core sampling tube 1 reasonably straight downward lengthwise into the bottom of a body of water. Such tube, however, may be from twelve to fifteen feet in length, and the tube diameter may be from two inches to twenty-four inches, for example. If the tube is to be driven in a reasonably vertical position, it is desirable to support it locally in upright fashion until it has been well started into the ground. The spider 7 and ring 8 would limit tilting of the guide sleeve 6 to a small angle so that the tube 1 would be held in an upright position, although it can slide freely lengthwise through the guide sleeve or collar.

The ring 8 can be suspended near the lower end of the tube 1 by lines 9 preferably of cable connected between lugs 10 on the ring and lugs 11 on the bottom of the casing 2. Preferably such lines diverge downwardly, as shown in FIGURE 2, to effect centering of the ring beneath the casing. As the tube and casing move downward during driving of the tube, the lines 9 will collapse, but the sleeve or collar 6 should be of sufficient length to continue to provide a guiding action for longitudinal movement of the tube, even though the initial layer of material into which the tube penetrates is quite soft.

The tube 1 cannot drop out of the casing 2 because the upper end of such tube has one or more external lugs or a flange 12 which will engage a cooperating flange or lugs 13 to limit the downward movement of the tube relative to the casing. The upper end of the casing is closed by a top 14, from which a bail 15 extends upward. To this bail is attached a hoisting line 16 by which the apparatus may be lowered from a boat, and by which it can be raised again.

The spark-discharge impulse mechanism is mounted on the casing 2 and includes principally a large condenser 17, which conveniently is of annular form encircling the casing. An electric cable 18, including several wires, extends from the casing upward alongside the line 16 to a control station on the boat from which the apparatus is suspended.

Electrodes 19 of heavy-gauge material depend from the top 14 of the casing downward into the impulse cavity 4 in the upper end of the tube 1 above the partition 3, to a location adjacent to such partition when the casing and the tube are in their most telescoped position. The lower ends of the electrodes 19 are turned toward each other to form a spark gap and are located from three-eighths of an inch to three-quarters of an inch apart, and preferably about one-half of an inch apart. The upper ends of these electrodes are insulated from the top 14 and are connected separately in the electric circuit shown in FIGURE 3 by leads 20.

A suitable electrical circuit for production of an electric spark discharge impulse is illustrated in FIGURE 3 simply as an example. The object is to provide a quick discharge of electricity across the spark gap between the electrodes 19 with a high current value. The potential required to effect such a discharge may be of the order of twenty thousand volts, and by using electrodes having a low resistance, the discharge may occur in a time period of one- to two-millionths of a second, so that the current flow typically may be $60 \times 10^6$ amperes. In order to produce such an electric spark discharge it is necessary to accumulate a large electrical charge in the condenser 17, and then discharge it abruptly. Such a condenser may have a capacity from twenty to five hundred microfarads, for example.

For charging the condenser the condenser-charging portion of the circuit shown in FIGURE 3 includes wires 21 extending from the condenser at the bottom of the body of water upward above the surface of the water to a suitable power source 22, which preferably is of the direct-current type. To reduce the current flowing through the condenser-charging portion of the circuit, a resistance unit 23 of suitable value may be included in it. When the condenser has been charged sufficiently it may be discharged through the spark gap between the electrodes 19 by closing the control switch 24 in the spark gap circuit.

In order to keep the leads between the condenser and the spark gap short the switch 24 must, of course, be mounted on the casing 2 rather than at the surface control station. Such switch can be remotely operated by a relay 25, which is connected in the control circuit 26, including a power source 27 and a control switch 28 located on the boat.

This apparatus can be operated effectively to take core samples from a body of water several miles deep. If, for example, the depth of the water is five miles, it would be necessary for the hoisting line 16 to be at least five miles in length. The apparatus is lowered by paying out the hoisting line until the lower end of tube 1 and ring 8 contact the bottom. As more line is payed out the casing 2 will slide down over the upper end of tube 1 until the top rests on the upper end of the tube, almost in the position shown in FIGURE 1. As the line is payed out still further, the weight of the apparatus will be borne by the bottom and the hoisting line will become slack, thus informing the operator on the boat that the device has reached the bottom. Sufficient slack should be permitted in the line so that the casing 2 can follow the tube 1 downward as it is driven.

If electricity from the source 22 is supplied through the condenser-charging circuit 21, the condenser will be charged. When switch 28 is closed, relay 25 will be energized to close switch 24 so that the electrical charge accumulated in the condenser 17 will be discharged through the circuit 20 to produce an electric discharge across the spark gap 19. Such a high discharge current accomplished in the short interval of time mentioned above will produce a vaporization or disintegration effect on the water in the spark gap to such an extent as to create a high pressure acting on the water in the impulse cavity 4. The pressure acting in a horizontal direction will be confined by the wall of the tube, and the water above the spark gap will be forced upwardly, but the inertia of this water and the fact that it reacts against the top 14 of relatively large area as compared to the area of the partition 3 will cause relatively little upward movement of the casing 2. The force of the impulse acting downward on the partition 3 will, however, drive the tube downward so as to slide the tube downward through the guide sleeve 6 and drive its lower end into the ground. Repeated impulses will thus produce progressive movement of the tube by increments of a magnitude depending upon the impulse produced in each instance.

Since each electric discharge is of a duration having a magnitude of one-millionth to two-millionths of a second, it is evident that several impulses per second can be produced if the condenser can be charged sufficiently quickly. For such rapidity of impulse production suitable mechanical means such as a rotary cam should be provided to close the switch 28, which would be of the normally open type. Alternatively, the circuit of FIGURE 3 could be designed so that when a given potential had been built up in the condenser 17, its accumulated charge would be discharged automatically through the spark gap without requiring a mechanical switch 24 in the spark gap circuit.

When the tube 1 has been driven into the ground until the lower end of the casing 2 rests upon the upper end of the collar 6, and the projections 12 have engaged the projections 13, the ring 8 and spider 7 will prevent the tube from being moved downward farther. The condenser-charging circuit will then be deenergized, or the switch 28 may be left open preparatory to withdrawing the tube 1 from the ground.

The tube 1 can be withdrawn mechanically from the ground by taking in hoisting line 16. The electric cable 18 containing the wires 21 and 26 will, of course, be somewhat longer than the line 16, so that such electric cable will not be subjected to excessive tension. By moving the line 16 upward the projection or projections 13 on casing 2 will be drawn against the projections 12 on the upper end of tube 1, and repeated upward movement of the line 16 will have a driving effect which will tend to loosen and withdraw the tube, since resistance to its upward movement will not be nearly as great as the resistance to its downward movement. As the tube 1 is being moved downward the resistance is considerably reduced by providing a sharpened lower end 29 on the tube, and by providing a vent hole 30 just below the partition 3. Such hole enables water to escape from the core-receiving lower end of the tube as the tube moves downward.

It should be understood that the most important feature of the invention is the provision between the spark gap and the condenser of short, heavy leads, as straight as possible, to avoid inductance and to reduce resistance to a very small value so as to enable the electricity stored in the condenser 17 to be discharged with great rapidity, in order to effect the disintegration of the medium between the electrodes at the spark gap and thus produce the high pressure impulse exerting the driving force on the partition 3 of the tube 1.

I claim as my invention:

1. An electric discharge pulse submarine driver comprising a submersible casing having a downwardly opening cavity therein, electrodes carried by said casing and extending into said cavity, said electrodes having adjacent but spaced-apart end portions within said cavity forming a spark gap, a condenser carried by said casing in close proximity to said electrodes, heavy, short leads connecting said electrodes and said condenser, means for charging said condenser and for effecting discharge thereof through said spark gap, a tubular member to be driven having its upper end received in the lower portion of such cavity of said casing and encircling such spark gap forming end portions of said electrodes and having its lower end extending a substantial distance downward below said casing, said tubular member having a partition therein located adjacent to said spark gap, a body of liquid within said casing in which said spark gap is submerged and in engagement with said partition, developing great force from an intense electric discharge across said spark gap, which force acts in a downward direction, and transmitting and applying such force to said partition as a driving force, and guide means carried by said casing and engaged with said tubular member at a location spaced a substantial distance below said casing for guiding movement of said tubular member relative to said casing by the driving force exerted thereon.

2. The electric discharge impulse submarine driver defined in claim 1, in which the guide means includes a ground-engaging member, a plurality of lines suspending said ground-engaging member from the casing at a location a substantial distance below the casing, and a guide sleeve carried by said ground-engaging member closely encircling the tubular member and slidably guiding the tubular member for movement through said guide sleeve.

3. An electric discharge impulse submarine driver immersible in a body of water comprising electrodes having adjacent, but spaced-apart, end portions forming a spark gap, a member to be driven located adjacent to said spark gap and having a water body bottom penetrating portion, a body of liquid in which said spark gap is submerged and in engagement with said member, electrical circuit means in circuit with said spark gap and including a condenser having a capacitance of at least twenty microfarads in close proximity to said electrodes, a charging circuit for said condenser, heavy, short leads connecting said condenser to said electrodes and forming a path capable of discharging across said spark gap the electric energy stored in said condenser within a few millionths of a second, and control means for effecting the electric discharge from said condenser through said spark gap producing an intense spark which develops great force transmitted by said body of liquid to said member for driving its bottom penetrating portion into the bottom of the body of water.

4. An electric discharge impulse submarine driver immersible in a body of water comprising electrodes having adjacent, but spaced-apart, end portions forming a spark gap, a condenser in close proximity to said electrodes, heavy, short leads connecting said electrodes and said condenser, means for charging said condenser and for effecting discharge thereof through said spark gap, an elongated member drivable lengthwise into the bottom of such body of water, having one end thereof located adjacent to said spark gap and an opposite water body penetrating end projecting away from said spark gap, and a body of liquid in which said spark gap is submerged and in engagement with the end of said member adjacent to said spark gap, developing great force from an intense electric discharge across said spark gap and transmitting and applying such force to such adjacent end of said elongated member as a lengthwise driving force.

5. An electric discharge impulse submarine driver comprising a casing submersible in a body of water, electrodes having adjacent, but spaced-apart, end portions within said casing forming a spark gap, a condenser mounted on said casing in close proximity to said electrodes, heavy, short leads connecting said electrodes and said condenser, means for charging said condenser and for effecting discharge thereof through said spark gap, an elongated member slidably guided by said casing for lengthwise displacement relative thereto in being driven into the bottom of such body of water and located adjacent to said spark gap, and a body of liquid within said casing in which said spark gap is submerged and in engagement with a wall of said elongated member disposed transversely of its length, developing great force from an intense electric discharge across said spark gap and transmitting and applying such force to said member lengthwise thereof as a driving force effecting such lengthwise displacement thereof relative to said casing.

6. The method of driving a submarine member into the bottom of a body of water, which comprises submerging in such a body of water in adjacent relationship the upper end of such member and a spark gap, storing an electrical charge in close proximity to such spark gap, and discharging the stored electrical charge across such spark gap within a time period of a few millionths of a second in an intense electrical discharge and thereby developing in the body of water a great force, transmitting such force by such water to the member to be driven and thus forcing the member into the bottom of the body of water.

References Cited in the file of this patent
UNITED STATES PATENTS

| | | |
|---|---|---|
| 1,152,697 | Bodde | Sept. 7, 1915 |
| 1,916,235 | Ruben | July 4, 1933 |
| 2,403,990 | Mason | July 16, 1946 |
| 2,559,227 | Rieber | July 3, 1951 |
| 2,650,068 | Rand | Aug. 25, 1953 |
| 2,651,027 | Vogel | Sept. 1, 1953 |
| 2,665,885 | Gignoux | Jan. 12, 1954 |
| 2,820,263 | Fruengel | Jan. 21, 1958 |

OTHER REFERENCES

"Drilling" (Steiger), March 1958, pages 106 and 107.

UNITED STATES PATENT OFFICE
CERTIFICATE OF CORRECTION

Patent No. 3,098,533                      July 23, 1963

Cyrus Warren Ostrom

It is hereby certified that error appears in the above numbered patent requiring correction and that the said Letters Patent should read as corrected below.

Column 4, line 40, for "pulse" read -- impulse --; column 5, line 30, after "body" insert -- bottom --.

Signed and sealed this 31st day of March 1964.

(SEAL)
Attest:
ERNEST W. SWIDER                      EDWARD J. BRENNER

Attesting Officer                     Commissioner of Patents